United States Patent [19]

Mathews

[11] Patent Number: 5,975,789
[45] Date of Patent: Nov. 2, 1999

[54] CLIP FOR ATTACHING MEMBRANE TO WIRE FRAME STRUCTURES AND WIRE FENCES

[76] Inventor: Linden H. Mathews, 3366 E. Fair Pl., Littleton, Colo. 80121

[21] Appl. No.: 08/961,787

[22] Filed: Oct. 31, 1997

[51] Int. Cl.$^6$ ...................................................... F16B 2/22
[52] U.S. Cl. ........................... 403/397; 403/354; 256/50; 24/459
[58] Field of Search ..................... 403/397, 396, 403/398, 399, 384, 354; 24/462, 459, 460, 30.55, 555; 256/50, 48, 47, 32, 54, DIG. 3

[56] References Cited

U.S. PATENT DOCUMENTS

| | | | |
|---|---|---|---|
| 1,925,488 | 9/1933 | Kern | 256/54 |
| 2,162,977 | 6/1939 | Searles | 403/354 X |
| 3,257,695 | 6/1966 | Frame | 24/459 X |
| 3,719,378 | 3/1973 | Windsor | 403/354 X |
| 4,068,966 | 1/1978 | Johnson et al. | 403/397 |
| 4,191,361 | 3/1980 | Jensen | 24/460 X |
| 4,490,138 | 12/1984 | Lipsky et al. | 403/354 X |
| 4,617,775 | 10/1986 | Padrun | 403/397 X |
| 4,773,437 | 9/1988 | Glutting | 256/32 X |
| 5,676,351 | 10/1997 | Speece et al. | 256/47 X |

FOREIGN PATENT DOCUMENTS

| | | | |
|---|---|---|---|
| 687129 | 5/1964 | Canada | 256/47 |
| 2549580 | 12/1977 | Germany | 256/48 |
| 3422049 | 12/1985 | Germany | 256/32 |
| 2231913 | 11/1990 | United Kingdom | 403/397 |

OTHER PUBLICATIONS

1–page specification sheet for the "Frost Blanket" manufactured by Fabriscape, Inc. (no date).

Primary Examiner—Harry C. Kim
Attorney, Agent, or Firm—William E. Hein

[57] ABSTRACT

A plastic clip, a plurality of which are employed to attach a plastic or fabric material to wire frame garden structures and wire fences, is formed in the general shape of a cylindrical shell, open at one end and closed at the other end, a peripheral wall of the shell having a pair of diametrically opposed slots formed longitudinally therein, each of the slots being tapered and terminating at an interior end thereof in a circular notch portion having a diameter slightly larger than the width of the tapered slot at its narrowest point. Each plastic clip may be quickly snapped into place over the plastic or fabric material and onto a wire member of the wire frame structure or wire fence. At such time as it is desired to remove the installed plastic or fabric material, each of the plastic clips holding it in place may be quickly and easily unsnapped from the wire member to which it was previously attached.

2 Claims, 1 Drawing Sheet

CLIP FOR ATTACHING MEMBRANE TO WIRE FRAME STRUCTURES AND WIRE FENCES

BACKGROUND AND SUMMARY OF THE INVENTION

This invention relates generally to wire frame structures of the type used by commercial and home gardeners, as well as to wire fences. More particularly, the present invention is directed to a plastic clip that is employed to quickly and easily attach a plastic or fabric material to those wire frame structures or fences.

Wire frame structures are in widespread use by commercial growers and by the home garden industry for protecting vegetable and flower plants from the potentially destructive forces of nature, such as sun, shade, wind, hail, and frost. They are also widely used to provide a "hot house" environment for early season growing of plants, by supporting a plastic bag or one of several versatile garden fabrics in a position over or surrounding the plants.

Wire fences are also in widespread use by the building industry to fence construction sites for security and by homeowners to fence yard areas and property lines. These wire fences, sometimes referred to as chain link fences, do not afford any degree of privacy. While plastic and fabric materials exist for use in adding privacy to wire fences, there is no known satisfactory method for attaching them using a plastic clip.

It would therefore be advantageous to provide an apparatus and method for attaching plastic or fabric materials to wire frame garden structures to afford protection from the elements of nature for plants within the wire frame structures. It would also be advantageous to employ the same apparatus and method for attaching plastic or fabric privacy materials to conventional wire fences.

In accordance with the illustrated preferred embodiment of the present invention, a plastic clip is employed to attach plastic or fabric materials to wire frame garden structures, as well as to wire fences. Each of the clips is formed in the general shape of a cylindrical shell, open at one end and closed at the other end, a peripheral wall of the shell having a pair of diametrically opposed slots formed longitudinally therein. Each of the slots is tapered and terminates at an interior end thereof in a circular notch portion having a diameter slightly larger than the width of the tapered slot at its narrowest point. This configuration allows the plastic clip to be snapped into place over the plastic or fabric material and onto a wire member of the wire frame structure or wire fence. At such time as it is desired to remove the installed plastic or fabric material, each of the plastic clips holding it in place may be quickly and easily unsnapped from the wire member to which it was previously attached.

DETAILED DESCRIPTION OF THE INVENTION

Figure 1:
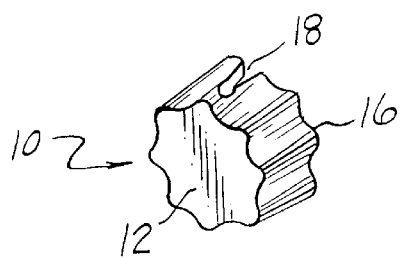
FIG. 1 is a front perspective view of the plastic clip of the present invention.
Figure 2:
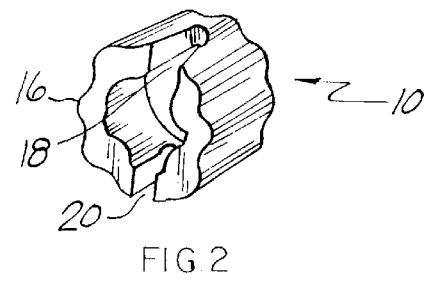
FIG. 2 is a rear perspective view of the plastic clip of FIG. 1.
Figure 3:
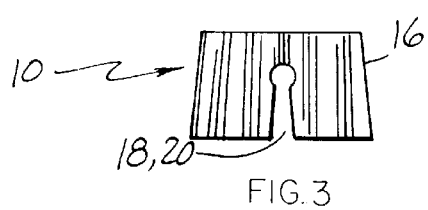
FIG. 3 is a side elevation view of the plastic clip of FIGS. 1 and 2.
Figure 4:
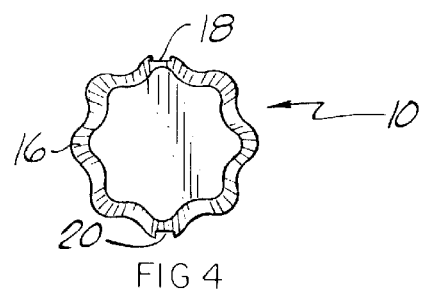
FIG. 4 is a rear elevation view of the plastic clip of FIGS. 1–3.

Referring now to FIGS. 1–4 there is shown a plastic clip 10 formed to have a generally flat front face 12 and a generally cylindrical peripheral wall 16. The clip 10 is open at its rear, as illustrated in FIGS. 2 and 4. A pair of diametrically opposed slots 18 and 20 are formed longitudinally in the peripheral wall 16 to retain a wire member 22, as illustrated in detail in FIG. 5. Each of the slots 18 and 20 is tapered from a larger opening width at the rear of plastic clip 10 to a narrower width at an interior termination end of the slot. Each of the slots 18 and 20 terminates in a circular notch portion having a diameter slightly larger than the width of the slot adjacent its circular notch portion. Plastic clip 10 may be fabricated using conventional plastic injection molding processes employing a resin that retains its resilience even when exposed to outside weather conditions, thereby permitting its respeated use.

Figure 5:
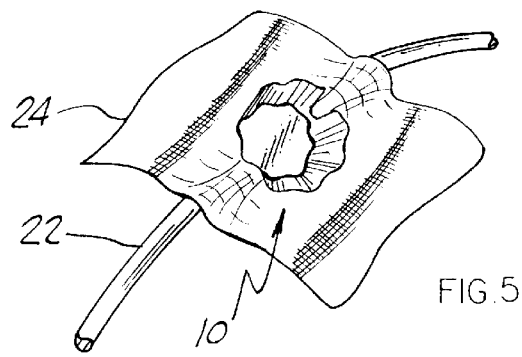
FIG. 5 is a pictorial diagram illustrating how a plastic or fabric material is attached to a wire member by means of the plastic clip of FIGS. 1–4.
Figure 6:
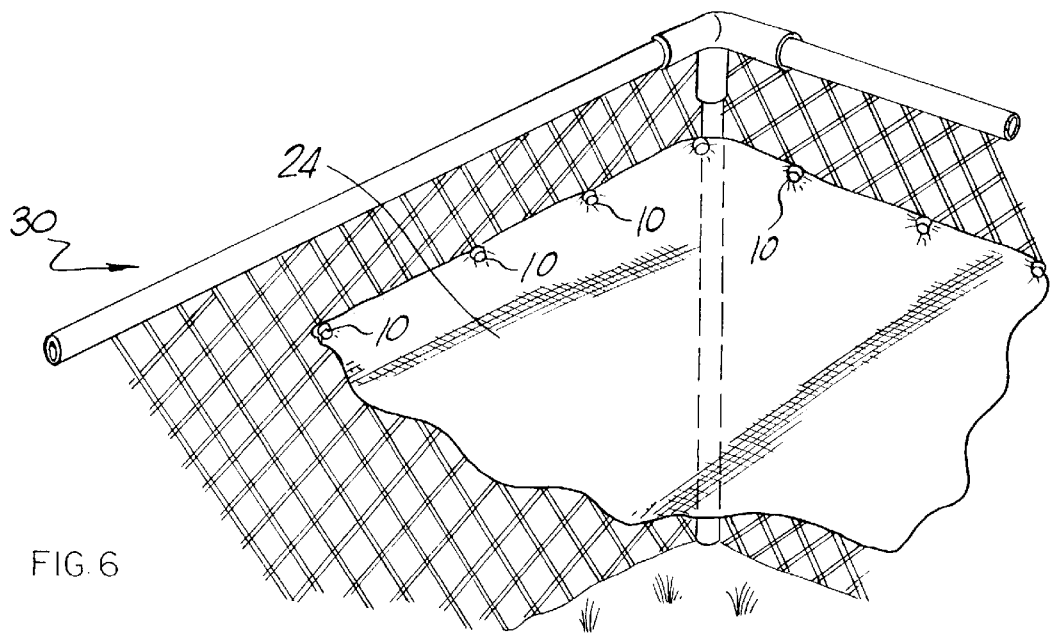
FIG. 6 is a pictorial diagram illustrating how a plastic of fabric material is attached to a conventional wire fence by means of the plastic clip of FIGS. 1–4.

Referring now to FIG. 5, there is shown a wire member 22, which may represent a wire member of a wire frame structure for enclosing plants, for example, or a wire member of a conventional wire fence like that illustrated in FIG. 6. A plastic or fabric material 24 to be attached to the wire member 22 is positioned over the wire member 22, and the plastic clip 10 is then pressed over both the material 24 and the wire member 22 such that the wire member 22 is retained within the terminating circular notch portions of the slots 18, 20.

Referring now to FIG. 6, there is shown a conventional wire fence 30 to which it is desired to attach a plastic or fabric material 24 for purposes of privacy, for example. A plurality of plastic clips 10 are used at chosen intervals to secure the material 24 to individual wire members of the fence 30. Material 24 may comprise any of a number of commercially available plastic or light fabric materials. Exemplary of these materials is the frost blanket manufactures by Fabriscape, Inc of Chicago, Ill. and widely available at garden shops, lumber yards, etc.

I claim:

1. A plastic clip for attaching a plastic or fabric membrane over wire frame garden structures and wire fences, the combination comprising:

a wire member over which the membrane is to be positioned and to which the membrane is to be secured; and the plastic clip in the form of a generally cylindrical shell, open at one end and closed at the other end, a peripheral wall of the shell having a pair of diametrically opposed slots formed longitudinally therein, each of the slots being tapered and terminating at an interior end thereof in a circular notch portion having a diameter slightly larger than the width of the tapered slot at its narrowest point, the cylindrical shell being adapted for snapping engagement of said circular notch portion with said wire member following positioning of the membrane over the wire member, thereby capturing the membrane between the circular notch portion and the wire member to secure the membrane on the wire member.

2. A method for attaching a plastic or fabric membrane to a wire of a wire frame garden structure or a wire fence, the method comprising:

providing a plurality of plastic clips, each plastic clip comprising a generally cylindrical shell, open at one end and closed at the other end, a peripheral wall of the shell having a pair of diametrically opposed slots formed longitudinally therein, each of the slots being tapered and terminating at an interior end thereof in a circular notch portion having a diameter slightly larger than the width of the tapered slot at its narrowest point;

positioning the membrane over said wire; and snapping each of said plurality of plastic clips in place over the membrane and said wire at selected locations to thereby secure the membrane in a desired position.

* * * * *